United States Patent [19]
Morris

[11] Patent Number: 5,240,036
[45] Date of Patent: Aug. 31, 1993

[54] CHECK VALVE WITH POPPET DASHPOT/FRICTIONAL DAMPING MECHANISM

[75] Inventor: Brian G. Morris, Houston, Tex.

[73] Assignee: The United States of America as represented by the Administrator of the National Aeronautics and Space Administration, Washington, D.C.

[21] Appl. No.: 902,265

[22] Filed: Jun. 22, 1992

[51] Int. Cl.$^5$ .................................. F16K 15/06
[52] U.S. Cl. .......................... 137/514.7; 137/514
[58] Field of Search ................. 137/514, 514.5, 514.7

[56] References Cited

U.S. PATENT DOCUMENTS

| | | | |
|---|---|---|---|
| 1,003,413 | 9/1911 | Ballard | 137/514.7 |
| 1,754,975 | 4/1930 | Anderson | 137/514.5 |
| 2,318,962 | 5/1943 | Parker | 137/514.5 |
| 2,969,085 | 1/1961 | Nystrom | 137/514.7 |
| 3,605,802 | 9/1971 | Hertell | 137/514.5 |
| 3,756,273 | 9/1973 | Hengesbach | 137/540 |

FOREIGN PATENT DOCUMENTS 0333526 2/1989 France.

*Primary Examiner*—Robert G. Nilson
*Attorney, Agent, or Firm*—Russell E. Schlorff; Guy M. Miller; Edward K. Fein

[57] ABSTRACT

An inline check valve for a flow line where the valve element is guided for inline travel forward and rearward of a valve sealing member and is spring biased to a closed sealing condition. One of the guides for the valve element includes a dashpot housing with a bore and plunger member to control the rate of travel of the valve element in either direction as well as providing a guiding function. The plunger member is arranged with a dashpot ring to frictionally contact the dashpot bore and has an interior tortuous flow path from one side to the other side of the dashpot ring. The dashpot housing is not anchored to the valve body so that the valve can be functional even if the dashpot ring becomes jammed in the dashpot housing.

6 Claims, 1 Drawing Sheet

CHECK VALVE WITH POPPET DASHPOT/FRICTIONAL DAMPING MECHANISM

ORIGIN OF THE INVENTION

The invention described herein was made by an employee of the United States Government and may be manufactured and used by or for the Government of the United States of America for government purposes without the payment of any royalties thereon or therefor.

RELATED APPLICATION

This application is related, to a co-pending application by the same inventor, U.S. application Ser. No. 07/902,266, filed Jun. 22, 1992 and entitled: "Check Valve with Poppet Damping Mechanism" (MSC 21903-1)".

FIELD OF THE INVENTION

This invention relates to check valves for fluid flow lines, and more particularly, to spring loaded, inline check valves with a poppet damping mechanism and to other valves where seating forces are light and the sealing of the valve member is assisted by a spring, a pneumatic actuator or gravity forces.

BACKGROUND OF THE INVENTION

Check valves are commonly used in numerous military and aerospace operations where dependable sealing and operating functions are required under demanding conditions. In typical check valves, a spring loaded valve member is located on a common longitudinal axis in a valve body or valve housing between an inlet port and an outlet port. A floating "O" ring seal on the valve member is used to establish contact with metal sealing surfaces of the valve member and a valve seat in the valve body to cushion closing of the valve and to insure perfect sealing. Fluid flow in one direction pushes the valve member open when the pressure exceeds a determined value which overcomes a closing force of a spring acting on the valve member. In the absence of sufficient differential pressure across the valve member or fluid flow in a reverse direction, the spring force seats the "O" ring on the valve member in a contact condition on the valve seat and prevents fluid flow. The valve member is arranged relative to the valve housing to compress the "O" ring sufficiently to engage metal sealing surfaces. The valve member is arranged to have a metal-to-metal contact with the valve housing to prevent extrusion of the "O" ring with an excess pressure differential. The valve member also has a guide extension slidably received in a guide bore in the valve housing to guide the valve member for to and fro motion along the longitudinal axis of the valve housing.

Because of the spring and the mass of the valve member, fluid flowing though the valve can cause a harmonic motion to occur at a natural frequency of the valve member which, over a period of time, results in accelerated wear of the valve member and its guide extension and guide bore. This is a common effect in gaseous fluid service and can ruin a valve in a matter of hours in some instances.

The wear of the valve member and its guide valve member extension and guide bore also increases the clearance between these two parts and the valve member can tip or wobble about its longitudinal axis which accelerates its wear and can ultimately cause the valve member to jam and the valve will fail.

The harmonic motion of the valve member can also introduce an undesirable disturbance in the consistency of fluid flow through the valve.

The accelerated wear of the valve member also can cause particulates to be generated in the fluid stream which can be deleterious to use of the fluid stream or can alter its characteristics.

Thus, a check valve can have regions of operating instability which a user must avoid because there is no damping mechanism for the vibration of the valve element during operation.

In pressure regulators sometimes a damper is incorporated in the form of a bellows-sealed chamber that breathes through one or more orifices as it is forced to change volume by motion of the valve member. In this type of system, the bellows is not very effective for damping and has a limited life. Small breather orifices are also subject to contamination or plugging in use.

PRIOR PATENT ART

U.S. Pat. No. 3,756,273 issued on Sep. 4, 1973 to R. W. Hangsbach discloses a check valve which is self cleaning and relates to an "O" ring location. The valve has a frusto-conical sealing surface and a frusto-conical valve element with an "O" ring in a seating groove. The "O" ring centers the valve element and provides the valve seal. The poppet is supported for axial movement toward and away from the seating surface and can float slightly in relation to the seating surface so that precise alignment is not necessary for seating. The patent shows a valve member which has extensions on either side of a valve member for guiding the valve elements.

European patent No. 333-326-A dated Feb. 3, 1989 and issued to D. Daniel discloses a delayed closure valve. A piston (2) has a calibrated orifice (6) through which water passes at a predetermined rate thus regulating the closure of the valve.

SUMMARY OF THE PRESENT INVENTION

The check valve of the present invention includes a valve housing with a flow passage having inline inlet and outlet ports and a centrally located circular valve seat disposed about a longitudinal axis. Guide bore means are located in the valve housing fore and aft of the valve seat and a valve member has fore and aft guide members slidably disposed in the guide bore means for guiding longitudinal movement of said valve member along the longitudinal axis when the valve member is moved to seat and to unseat relative to the valve seat. The valve member is arranged with an elastomer O-ring which seals under compression between the valve seat and the valve member under the resilient bias of a spring member. The valve member also engages a stop flange in the valve body to limit compression of the O-ring and to prevent extrusion.

One of the guide means includes a tubular bypass housing in the valve housing which slidably receives a closed dashpot member and also bypasses fluid around the dashpot member. The spring member is disposed between the dashpot member and the valve member so that the valve member and dashpot member in an extended condition, respectively engage the stop flange and a flange located in the bypass housing. In moving to a contracted condition, the valve member compresses the spring member as the valve member moves toward the dashpot member and an open condition of the valve.

The valve member has an guide extension member slidably arranged within the dashpot member and provided with an annular flow guide ring which is in frictional engagement with the bore of the dashpot member. The guide ring and the dashpot member define a flow path which produces a damping function when the guide extension member is stroked or moved relative to the dashpot member.

DESCRIPTION OF THE PRESENT INVENTION

Figure 1:
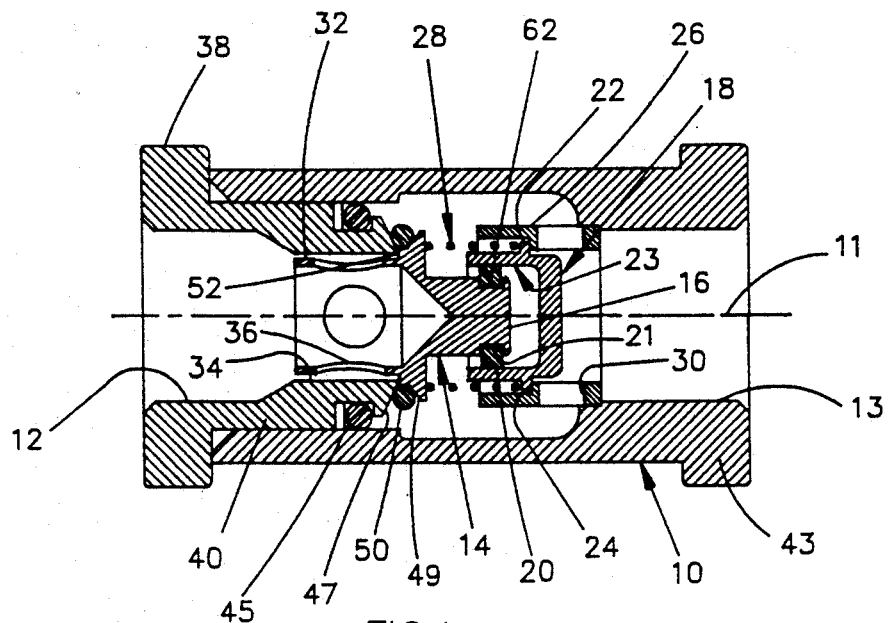
FIG. 1 is a view in longitudinal cross-section illustrating a check valve embodying the present invention and shown in a closed position.
Figure 2:
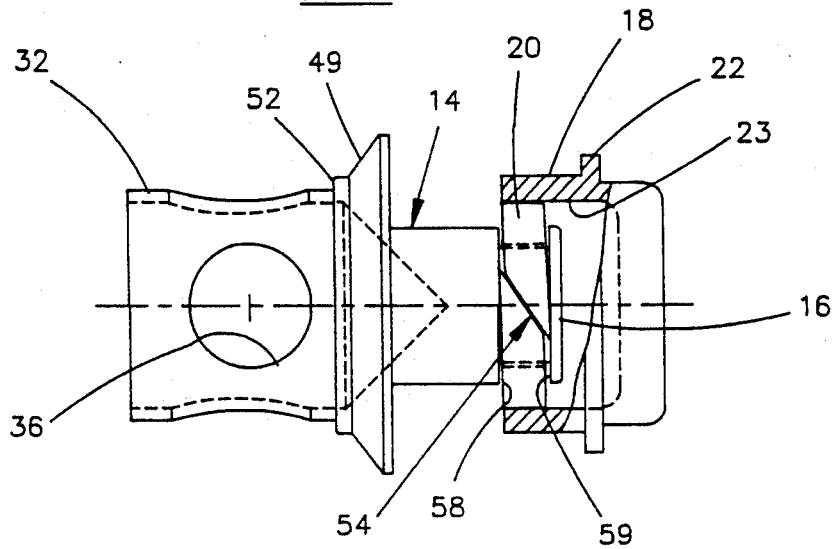
FIG. 2 is an enlarged view of a valve member and dash pot member embodying the present invention

Referring now to FIGS. 1 and 2, the valve of the present invention includes a tubular valve body or valve housing 10 which extends along a longitudinal axis 11 and defines an in-line inlet 12 and an outlet 13. A poppet or valve member 14 is slidably arranged in the housing 10 for movement along the longitudinal axis 11. The valve member 14 has a forward guide extension 16 which is slidably disposed within a closed dashpot member 18. An annular dashpot ring 20 which is a dashpot plunger is disposed in an annular groove 21 in the guide extension 16. The ring or dashpot plunger 20 is constructed to resiliently expand in radial direction so that the outer surface of the dashpot plunger 20 frictionally and slidably engages the bore 23 of the dashpot member 18.

The dashpot member 18, has an outer or exterior dashpot flange 22 arranged to engage an internal flange or shoulder 24 on a tubular bypass housing member 26. A spring member 28 is disposed in compression between the dashpot flange 22 and a transverse wall surface on the valve member 14. The bypass housing member 26 is attached in a counterbore in the housing 10. The bypass housing member has circumferentially arranged ports 30 so that fluid flow can bypass the dashpot member 18.

The valve member 14 has a rearward tubular guide extension 32 disposed in a guide bore 34 of the housing 10. The tubular guide extension 32 is provided with circumferentially arranged openings 36 to permit fluid bypass flow. The guide extension 32 and the guide bore 34 have a sufficient annular clearance space to permit a sliding motion yet provide a guide means for the valve member 14.

The valve housing 10 is usually in two parts and one part 38 of the valve housing 10 has a tubular insert portion 40 received within the tubular end of the other part 43 of the valve housing. An "O" ring 45 in an O-ring groove in the insert portion 40 seals the parts 38 and 43 relative to one another. The parts 38 and 43 can be threadedly connected or coupled together in any suitable manner.

The valve has sealing means which include a frusto-conical surface 47 on the housing part 38, a frusto-conical surface 49 on the valve member 14 and an "O" ring 50. The inner end of the surface 47 about the guide bore 34 provides a mechanical stop for the valve member 14.

As described above, the spring member 28 is disposed in compression between the valve member 14 and the dashpot member 18. The spring member 28 assures that the O-ring 50 sealingly engages the frusto-conical surfaces 47 and 49. Compression of the O-ring 50 is limited by engagement of a stop surface 52 on the valve member 14 with an inner end of the surface 47 which is disposed about the guide bore 34.

When a pressure differential occurs across the valve member 14 due to fluid flow into the inlet 12, the valve member 14 is shifted toward the outlet 13 and fluid flow occurs through the openings 36 and the ports 30 to the outlet 13. As illustrated, the bypass housing member 26 is located in an enlarged cavity in the valve housing and the opening of the ports 30 are made as large as possible to avoid restriction of fluid flow. When the valve member 14 is shifted (and the valve is opened) the spring 28 is further compressed and the guide extension 16 and dashpot ring 20 slide in the bore 23 of the dashpot member 18. Thus, the guide extension 16 and the dashpot ring 20 in the bore 23 of the dashpot member 18 provide a guide means for the valve member 14.

As noted, the valve member 14 has guide members in a bore 34 of the valve housing 10 and in the bore 23 of the dashpot member 18 for guiding means. Since the dashpot member 18 is closed at one end, when the guide extension 16 and the dashpot ring 20 are moved axially within the dashpot member 18, fluid flows either into or out of the open end of the dashpot member 18 depending upon the direction of movement of the dashpot member.

Figures 3A, 3B, 4A, 4B:
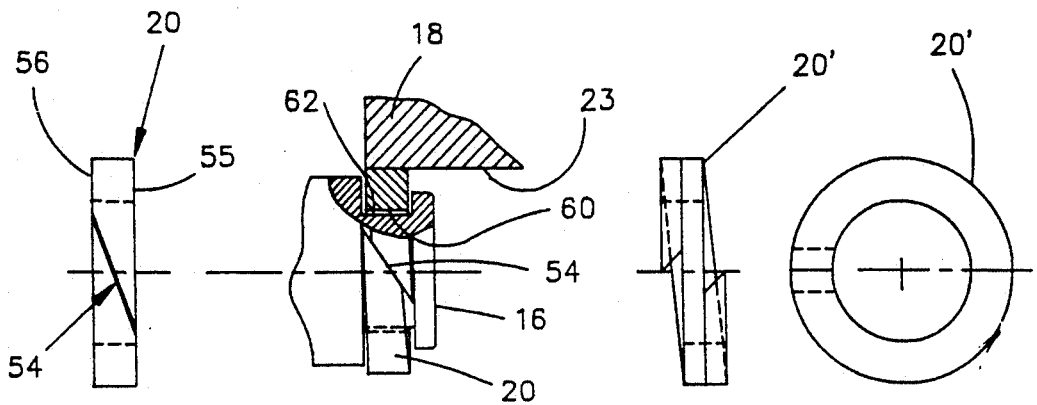
FIG. 3A is a side view of a dashpot ring for the valve.
FIG. 3B is a partial side view with a cutaway to illustrate the flow path relationship of the dash pot ring in a dashpot member.
FIG. 4A and 4B are side and front views of a different form of dashpot ring for the valve.

The dashpot ring, in a relaxed condition as shown in FIG. 3A is an annular ring 20 with a bias cut 54 extending from one side surface 55 to the opposite side surface 56. The bias cut 54 is at an acute angle with respect to the parallel planes defined by the end surfaces 55 and 56 of the dashpot ring 20. The dashpot ring 20 is located between the side surfaces of 58, 59 (see FIG. 2) of the annular groove 21 in the guide extension 16.

The dashpot ring 20 is made from a resilient material which is constructed and sized so that the dashpot ring 20 can be compressed radially when it is disposed in the bore 23 of the dashpot member 18 (See FIG. 2 and FIG. 3B). The radial reduction or compression of the dashpot ring 20 causes the surfaces along the bias cut 54 to slide relative to one another so that the dashpot ring 20 has a spiral configuration with the planes of the side surface 58 and 59 at angle with respect to the side surfaces 58, 59 of the annular groove 21. In the compressed condition of the dashpot ring 20 in the dashpot member 18, the dashpot ring 20 has a central bore 60 with a larger diameter than the diameter of the bottom surface 62 of the annular groove 21. (See FIG. 3B) The annular spacing between the bore 60 and the surface 62 defines an annular flow passage. The angular disposition of the side surfaces 55 and 56 with respect to the side surface 58 and 59 of the annular groove 21 provide for fluid communication to the annular flow passage.

It will be appreciated that movement of the dashpot ring 20 relative to the dashpot member 18 forces fluid to follow a tortuous path between the side surfaces and the bore of the dashpot ring 20 as it is moved into and out of the dashpot bore 23. If desired, a C-shaped spring can be molded within the dashpot ring 20 to provide constant loading force against the wall of the dashpot member.

As shown in FIGS. 4A and 4B, the dashpot ring 20' can assume other forms. In FIGS. 4A and 4B, the dashpot ring element is initially formed with a spiral configuration and has a rectangular shaped cross-section. The flow path is formed in the annulus between the turns of the dashpot ring element and the bottom surface of the groove. The width of the dashpot ring element and the number of turns are determining factors in establishing the flow area and the flow resistance. The damping action is a combination of the frictional resistance of the dashpot ring 20 in the bore 23 and the flow area through dashpot ring 20. Use of a cut or spirally wound ring permits use of more lenient dimensional tolerances and is more tolerant than would a continuous ring of temperature changes which could otherwise bind the parts to one another.

The dashpot ring 20 can be made of a polyfluoroethylene such as Teflon (TM) or other material which has a characteristic low coefficient of friction and pliability to preclude a particulate jamming yet having sufficient hardness to avoid acting as a sealing member.

If the valve member 14 somehow becomes locked or jammed in the dashpot member 18 by a particulate object, the valve still functions as check valve because flow in a reverse direction will still close the valve member on the valve seat and prevent reverse flow. This is because the dashpot member 18 is not anchored to the valve body member. Thus, the valve can still function to open and close although the spring closure force is lost.

The dashpot 18 and dashpot ring 20 dampen the rate of movement of the valve member 14 so that harmonic motions are not developed. Tipping of the valve member relative to the longitudinal axis of the valve is prevented because the forward and rearward ends of the valve member are guided in guide means.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A check valve with an inlet and outlet arranged on a common longitudinal axis for use in a flow line and including:
   a valve body having a passageway extending along said longitudinal axis between said inlet and said outlet;
   means defining guide bores in said valve body along said longitudinal axis;
   a valve member disposed between said guide bores and arranged for longitudinal movement between a closed position relative to a valve seat in said valve body and an open position which is displaced from said valve seat, said valve member having guide members respectively slidably disposed in said guide bores for guiding said valve member between said closed position and said open position;
   spring means disposed between said valve element and one of said means defining guide bores for urging said valve member toward said closed position,
   said one means defining guide bores having a closed end to form an open ended dashpot chamber which receives one of said guide members, said one guide member having a dashpot plunger element slidably and frictionally received but not sealingly in the bore of said one means, said plunger element having a defined interior flow path from one side of said plunger element in said dashpot chamber to the other side of said plunger element for controlling the rate of travel of said plunger element relative to said dashpot chamber, said plunger element has an annular ring configuration and is constructed from polyfluoroethylene, a material having a low coefficient of friction and sufficient hardness to resist sealing with respect to said dashpot chamber, where the plunger element is disposed in an annular groove on said one guide member whereby said valve member is shiftable between said closed position and said open position at a controlled rate of speed as a function of the defined flow path.

2. The check valve as set forth in claim 1 wherein said plunger element has an annular clearance space with respect to the annular groove on said one guide member for defining a flow passage.

3. The check valve as set forth in claim 1 wherein said dashpot plunger element includes a spirally wound part constructed from polyfluoroethylene material and is disposed in a groove on said one guide member.

4. The check valve as set forth in claim 1 wherein said one means defining guide bores includes an independent dashpot housing movable disposed in a bore in said valve body, said dashpot housing having an internal bore for receiving said dashpot plunger element and having an external flange located between a stop shoulder in the valve body and said spring means.

5. The check valve as set forth in claim 4 wherein said valve body has bypass means for bypassing fluid around said dashpot housing.

6. A check valve with an inlet and an outlet arranged on a common longitudinal axis for use in a flow line and including:
   a valve body having a passageway extending along said longitudinal axis between said inlet and outlet;
   a dashpot member disposed in the outlet of said valve body, said dashpot member having a closed end and an open end;
   a valve seat in said valve body said valve seat being disposed about said longitudinal axis;
   a valve member disposed in said valve body and having valve sealing means, said valve member being movable longitudinally between a closed position relative to said valve seat and an open position relative to said valve seat;
   spring means disposed between said dashpot member and said valve member for normally urging said valve sealing means to a closed position;
   means for controlling the rate of movement of said valve member between said open position and said closed position including a dashpot plunger element on said valve member, said dashpot member is movably disposed in a support housing in said valve body relative to a stop flange in said support housing so that said dashpot member can be moved with said valve member toward the closed position of the valve member on the valve seat in the event the plunger element become stuck in the dashpot member, wherein said support housing has fluid bypass means, and said plunger element being slidably and frictionally received but not sealingly in the open end of said dashpot member, said plunger element having an interior flow passage within the dashpot member for bypassing fluid from said dashpot member and damping the motion of said valve member; and
   guide means for said valve member in the inlet of said valve body.

* * * * *